(12) United States Patent
Tomiyama

(10) Patent No.: US 11,215,234 B2
(45) Date of Patent: Jan. 4, 2022

(54) ROTARY DEVICE AND CENTERING STRUCTURE THEREOF

(71) Applicant: EXEDY Corporation, Neyagawa (JP)

(72) Inventor: Naoki Tomiyama, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 91 days.

(21) Appl. No.: 16/906,544

(22) Filed: Jun. 19, 2020

(65) Prior Publication Data

US 2021/0033150 A1 Feb. 4, 2021

(30) Foreign Application Priority Data

Aug. 2, 2019 (JP) .............................. JP2019-142894

(51) Int. Cl.
*F16D 3/04* (2006.01)

(52) U.S. Cl.
CPC ...................................... *F16D 3/04* (2013.01)

(58) Field of Classification Search
CPC ..... F16D 3/02; F16D 3/04; F16D 3/20; F16D 3/50
See application file for complete search history.

(56) References Cited

U.S. PATENT DOCUMENTS

| 4,259,043 A * | 3/1981 | Hidden | F01C 1/0207 |
| | | | 384/609 |
| 4,994,005 A * | 2/1991 | Rennerfelt | F16D 3/04 |
| | | | 475/162 |
| 6,206,665 B1 * | 3/2001 | Iizuka | F01C 17/063 |
| | | | 418/55.3 |
| 2009/0156318 A1 * | 6/2009 | Tashiro | F16D 3/04 |
| | | | 464/103 |
| 2018/0087579 A1 * | 3/2018 | Zika | F16C 33/303 |

FOREIGN PATENT DOCUMENTS

| JP | 2007-205847 A | 8/2007 |
| JP | 2013-217452 A | 10/2013 |

* cited by examiner

*Primary Examiner* — Francis C Gray
(74) *Attorney, Agent, or Firm* — United IP Counselors, LLC

(57) ABSTRACT

A centering structure is provided in a device including a first member with an inner peripheral surface and a second member with an outer peripheral surface opposed to the inner peripheral surface. The centering structure includes outer peripheral cam surfaces circumferentially aligned on the inner peripheral surface of the first member, inner peripheral cam surfaces opposed to the outer peripheral cam surfaces, and rolling elements. The inner peripheral cam surfaces form accommodation spaces together with the outer peripheral cam surfaces therebetween. The rolling elements are disposed in the accommodation spaces. Each rolling element rolls along each outer peripheral cam surface and each inner peripheral cam surface. The rolling elements move the first or second member in a direction to cause a center of the inner peripheral surface and a center of the outer peripheral surface to be matched when the first and second members are rotated relative to each other.

7 Claims, 7 Drawing Sheets

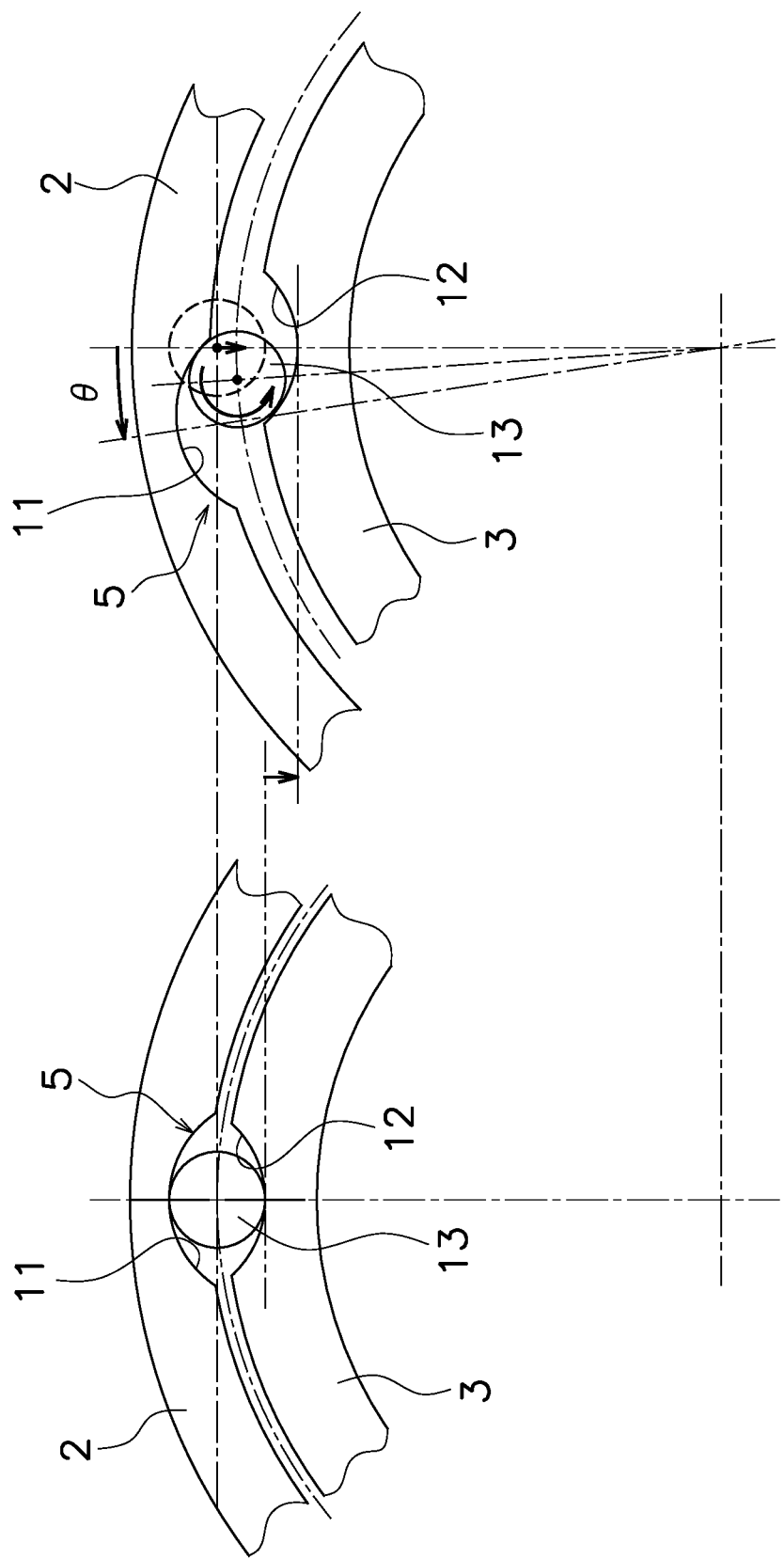

ROTARY DEVICE AND CENTERING STRUCTURE THEREOF

CROSS-REFERENCE TO RELATED APPLICATIONS

This application claims priority to Japanese Patent Application No. 2019-142894, filed on Aug. 2, 2019. The contents of that application are incorporated by reference herein in their entirety.

TECHNICAL FIELD

The present invention relates to a centering structure, particularly to, a centering structure installed in a device, composed of a first member including an inner peripheral surface having an annular shape and a second member that includes an outer peripheral surface opposed to the inner peripheral surface and is rotatable relative to the first member within a predetermined angular range, in order to center the second member with respect to the first member. Besides, the present invention relates to the device including the centering structure described above.

BACKGROUND ART

There is a type of structure for centering, i.e., aligning axes of two members that are disposed in radial alignment and are rotatable relative to each other as described in Japan Laid-open Patent Application Publication Nos. 2007-205847 and 2013-217452.

Japan Laid-open Patent Application Publication No. 2007-205847 describes that a gauge having a columnar shape is inserted into the inner periphery of a work including a plurality of internal teeth in order to center the work. The gauge is provided with a plurality of protrusions on the outer peripheral surface thereof. Each protrusion is provided with a radial positioning surface and makes contact at the radial positioning surface with the inner peripheral surface of each internal tooth of the work.

On the other hand, Japan Laid-open Patent Application Publication No. 2013-217452 describes that an output member is disposed radially inside an intermediate member while a radial positioning portion of the output member supports the inner peripheral surface of the intermediate member. With this configuration, the intermediate member is centered with respect to the output member.

As described in Japan Laid-open Patent Application Publication Nos. 2007-205847 and 2013-217452, the well-known centering structures are configured such that one of two members makes contact at the inner peripheral surface thereof with the outer peripheral surface of the other. The two members are rotatable relative to each other. Hence, friction slide occurs at the contact part of the two members. A hysteresis torque is generated between the two members by the friction slide. Due to the hysteresis torque, there are chances of degradation in vibration attenuation performance in such a damper mechanism as described in Japan Laid-open Patent Application Publication No. 2013-217452.

Moreover, the well-known centering structures are often configured such that two members are centered while making contact with each other constantly at the same part. Because of this, abrasion of the contact part progresses. This results in degradation in durability of the two members. To prevent degradation in durability of the two members, it is herein required to manage the contact part for centering the two members at high accuracy.

BRIEF SUMMARY

It is an object of the present invention to provide a centering structure, which is capable of reducing the magnitude of hysteresis torque generated between two members and enhancing durability of the two members as well without necessity of high accuracy, and a device including the same.

(1) A centering structure according to the present invention is provided in a device including a first member and a second member. The first member includes an inner peripheral surface having an annular shape. The second member is rotatable relative to the first member within a predetermined angular range and includes an outer peripheral surface that has an annular shape and is opposed to the inner peripheral surface.

The centering structure includes a plurality of outer peripheral cam surfaces, a plurality of inner peripheral cam surfaces and a plurality of rolling elements. The plurality of outer peripheral cam surfaces are provided in circumferential alignment on the inner peripheral surface of the first member. The plurality of inner peripheral cam surfaces are provided in opposition to the plurality of outer peripheral cam surfaces on the outer peripheral surface of the second member. The plurality of inner peripheral cam surfaces form a plurality of accommodation spaces together with the plurality of outer peripheral cam surfaces therebetween. The plurality of rolling elements are disposed in the plurality of accommodation spaces. Each of the plurality of rolling elements is capable of rolling along each of the plurality of outer peripheral cam surfaces and each of the plurality of inner peripheral cam surfaces. When the first member and the second member are rotated relative to each other, the plurality of rolling elements move either the first member or the second member in such a direction as to cause a center of the inner peripheral surface of the first member and a center of the outer peripheral surface of the second member to be matched with each other.

Here, the plural rolling elements are disposed in the plural accommodation spaces provided between the plural outer peripheral cam surfaces of the first member and the plural inner peripheral cam surfaces of the second member, respectively. When the first and second members are herein rotated relative to each other, each rolling element rolls along each outer peripheral cam surface and each inner peripheral cam surface. Then in conjunction with rolling of each rolling element along each outer peripheral cam surface and each inner peripheral cam surface, the first and second members are moved in such a direction as to cause the center of the inner peripheral surface of the first member and that of the outer peripheral surface of the second member to be matched with each other. In other words, the first and second members are centered.

Unlike in a well-known centering structure, it is not required to finish respective cam surfaces at high accuracy in the centering structure described above. Hence, manufacturing the two members is made easy. Besides, not friction slide but rolling slide is employed as the form of slide between each pair of outer and inner peripheral cam surfaces and each rolling element. This results in reduction in magnitude of hysteresis torque generated between the two members. Furthermore, contact parts, in each of which each pair of outer and inner peripheral cam surfaces and each rolling element make contact with each other, are dispersed in a plurality of locations without providing such a contact part only in a single location. Hence, abrasion of each contact part can be inhibited, whereby durability of the two members is enhanced.

Moreover, when each accommodation space is set to have an appropriate shape, the centering structure is obtained as a structure that allows relative rotation between the first and second members within the predetermined angular range but prevents relative rotation between the first and second members outside the predetermined angular range. In other words, the centering mechanism is enabled to function as a torque limiter that blocks transmission of torque (allows relative rotation) between the two members within the predetermined angular range but allows transmission of torque (prevents relative rotation) between the two members outside the predetermined angular range.

Furthermore, when each cam surface is set to have an appropriate profile, it is also possible to realize a damper function that torsional stiffness increases with relative rotation (torsion angle) between the two members.

(2) Preferably, each of the plurality of accommodation spaces is gradually reduced in radial gap from a circumferential middle thereof to both circumferential sides thereof.

(3) Preferably, the each of the plurality of outer peripheral cam surfaces of the first member is shaped to bulge to an outer peripheral side, whereas the each of the plurality of inner peripheral cam surfaces of the second member is shaped to bulge to an inner peripheral side.

It should be herein noted that the configuration of each cam surface shaped to "bulge" is not limited to a configuration of each cam surface made in the shape of, for instance, a curved surface having a circular-arc shape but encompasses other configurations such as a configuration of each cam surface shaped to protrude to an outer or inner peripheral side by a plurality of straight surfaces (flat surfaces).

(4) Preferably, the each of the plurality of outer peripheral cam surfaces is shaped to be gradually reduced in radius from a circumferential center thereof to both circumferential sides thereof. Besides, in this case, the each of the plurality of inner peripheral cam surfaces is shaped to be gradually increased in radius from a circumferential center thereof to both circumferential sides thereof.

(5) Preferably, the each of the plurality of outer peripheral cam surfaces is provided in opposition to another of the plurality of outer peripheral cam surfaces through the center of the inner peripheral surface, while the each of the plurality of inner peripheral cam surfaces is provided in opposition to another of the plurality of inner peripheral cam surfaces through the center of the outer peripheral surface.

(6) Preferably, the first member includes an annular portion. The annular portion includes the inner peripheral surface. Besides, the second member preferably includes a disc portion. The disc portion includes the outer peripheral surface and is disposed on an inner peripheral side of the annular portion.

(7) A device according to the present invention includes a first member, a second member and the centering structure configured as any of the above. The first member includes an inner peripheral surface having an annular shape. The second member is rotatable relative to the first member within a predetermined angular range and includes an outer peripheral surface that has an annular shape and is opposed to the inner peripheral surface. The centering structure centers the first and second members.

Overall, according to the present invention described above, a centering structure can be realized with lower accuracy than a well-known centering structure. Besides, the centering structure according to the present invention can reduce the magnitude of hysteresis torque generated between two members and can enhance durability of the two members as well.

BRIEF DESCRIPTION OF THE DRAWINGS

FIGS. 3A and 3B are diagrams for explaining actuation of the centering structure.

DETAILED DESCRIPTION

[Configuration]

Figure 1:
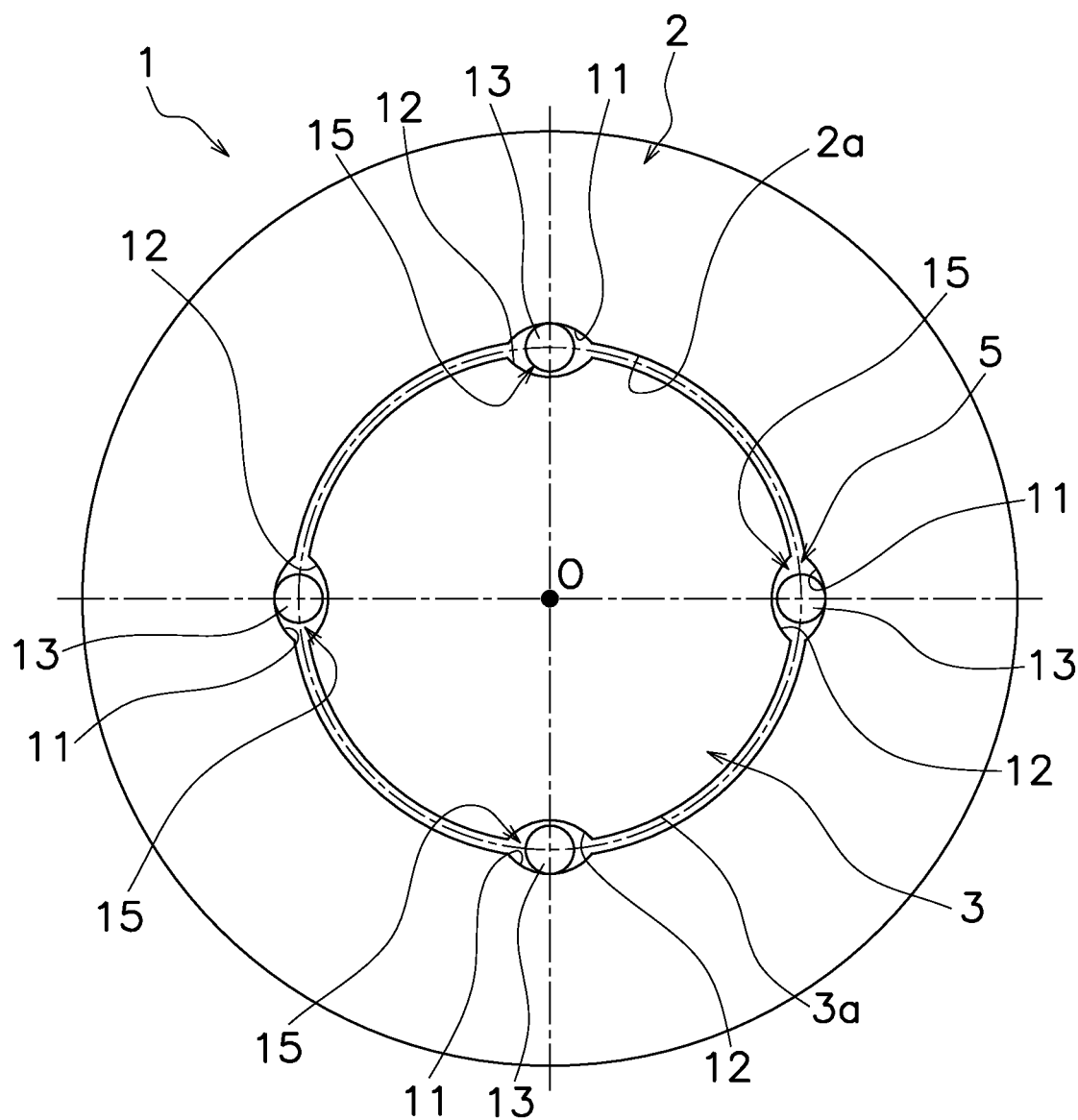
FIG. 1 is a front view of a device including a centering structure according to a preferred embodiment of the present invention.

FIG. 1 is a front view of a rotary device (1) (exemplary device) including a centering structure (5) according to a preferred embodiment of the present invention. The rotary device 1 includes an outer peripheral rotor 2 (exemplary first member) and an inner peripheral rotor 3 (exemplary second member). The both rotors 2 and 3 are radially supported by each other through the centering structure 5.

The outer peripheral rotor 2 has an annular shape and includes an inner peripheral surface 2a. The inner peripheral rotor 3 is made in the shape of a disc including an outer peripheral surface 3a and is disposed on the inner peripheral side of the outer peripheral rotor 2. The outer peripheral rotor 2 and the inner peripheral rotor 3 are both rotatable about a common rotational center O. Besides, the outer peripheral rotor 2 and the inner peripheral rotor 3 are disposed while the inner peripheral surface 2a and the outer peripheral surface 3a are separated at a predetermined radial gap by the centering structure 5. Moreover, the outer peripheral rotor 2 and the inner peripheral rotor 3 are rotatable relative to each other within an angular range allowed by the centering structure 5.

The centering structure 5 centers the inner peripheral rotor 3 with respect to the outer peripheral rotor 2. The centering structure 5 is provided between the inner peripheral surface 2a of the outer peripheral rotor 2 and the outer peripheral surface 3a of the inner peripheral rotor 3. Specifically, the centering structure 5 includes a plurality of (four in this example) outer peripheral cam surfaces 11, a plurality of inner peripheral cam surfaces 12 that the number thereof is equal to that of the outer peripheral cam surfaces 11, and a plurality of rolling elements 13 that the number thereof is equal to that of the outer/inner peripheral cam surfaces 11, 12.

The four outer peripheral cam surfaces 11 are disposed in circumferential alignment at equal angular intervals of 90 degrees on the inner peripheral surface 2a of the outer peripheral rotor 2. In other words, each outer peripheral cam surface 11 is disposed in opposition to another of the outer peripheral cam surfaces 11 through the rotational center O. Each outer peripheral cam surface 11 is made in the shape of a curved surface bulging to the outer peripheral side and is shaped to be gradually reduced in radius from the circumferential center thereof to the both circumferential sides thereof.

The four inner peripheral cam surfaces 12 are disposed in opposition to the outer peripheral cam surfaces 11 on the outer peripheral surface 3a of the inner peripheral rotor 3, respectively. In other words, each inner peripheral cam surface 12 is also disposed in opposition to another of the inner peripheral cam surfaces 12 through the rotational center O. Each inner peripheral cam surface 12 is made in the shape of a curved surface bulging to the inner peripheral side and is shaped to be gradually increased in radius from the circumferential center thereof to the both circumferential sides thereof.

An in-between of each pair of outer and inner peripheral cam surfaces 11 and 12 described above, i.e., a radial gap between each pair of cam surfaces 11 and 12, is provided as an accommodation space 15. The radial gap (the accommodation space 15) is gradually reduced from the circumferential middle thereof to the both circumferential sides thereof.

In the present preferred embodiment, the rolling elements 13 are rollers. Each roller 13 is disposed in each accommodation space 15 and is capable of rolling along each pair of outer and inner peripheral cam surfaces 11 and 12.

[Working of Centering Structure 5]

Figure 2B:
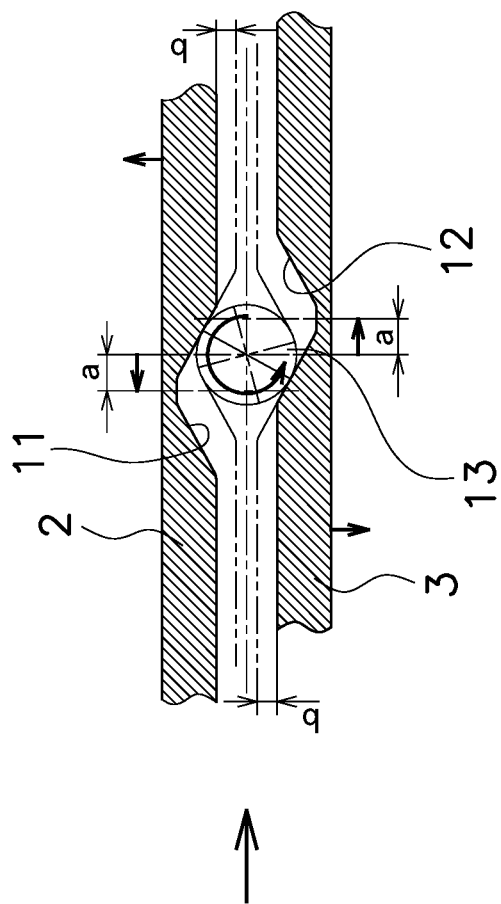
FIGS. 2A and 2B are diagrams for explaining a principle of the centering structure.
Figure 2A:
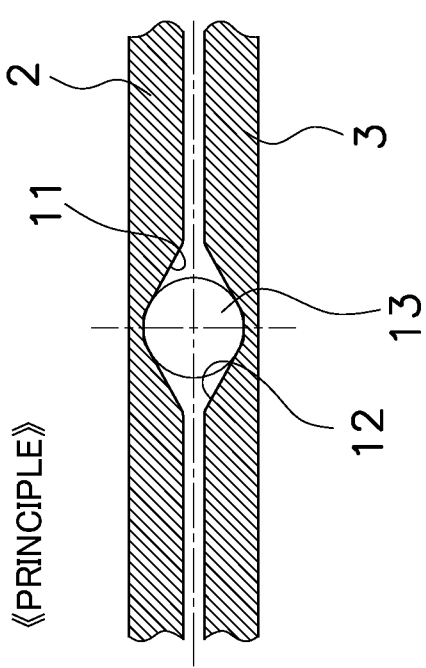

A principle of actuating the centering structure 5 will be explained with FIGS. 2A and 2B. FIGS. 2A and 2B show the outer peripheral rotor 2 and the inner peripheral rotor 3 in planar development. FIG. 2A shows a condition without relative rotation (torsion) between the outer peripheral rotor 2 and the inner peripheral rotor 3, whereas FIG. 2B shows a condition with relative rotation between the both rotors 2 and 3.

In transition from the condition shown in FIG. 2A to such a condition as shown in FIG. 2B that the outer peripheral rotor 2 is moved in one of opposed directions by distance a whereas the inner peripheral rotor 3 is moved in the other of the opposed directions by the distance a (this is actually a condition that torsion is caused by a relative angle corresponding to distance 2a), each roller 13 rolls along each pair of outer and inner peripheral cam surfaces 11 and 12. As a result of movement of each roller 13 along each pair of cam surfaces 11 and 12, one of the outer peripheral rotor 2 and the inner peripheral rotor 3 is moved to separate from the other by distance b and vice versa.

FIGS. 3A and 3B show a condition that the actuation principle described above is applied to two rotors. In transition from a condition without relative rotation between the outer peripheral rotor 2 and the inner peripheral rotor 3 (FIG. 3A) to a condition with relative rotation therebetween by angle θ (FIG. 3B), each roller 13 rolls along each pair of outer and inner peripheral cam surfaces 11 and 12, whereby the inner peripheral rotor 3 is moved toward the rotational center O.

Figure 4B:
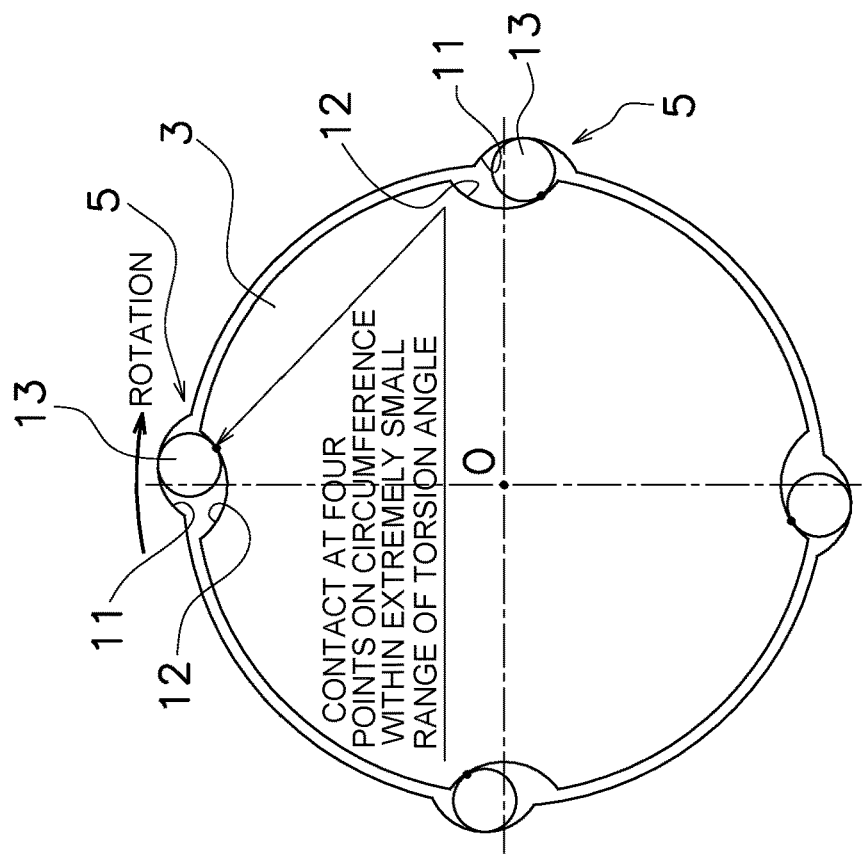
FIGS. 4A and 4B are diagrams for explaining a centering motion to be performed by the actuation of the centering structure.
Figure 4A:
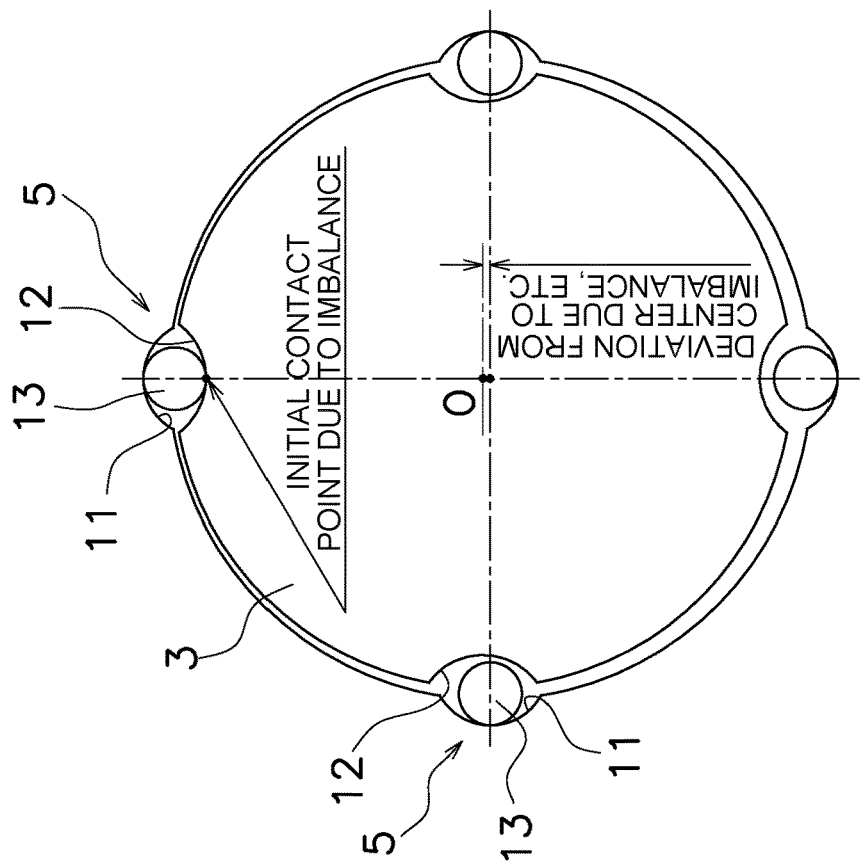

FIGS. 4A and 4B show an example in which the working described above is applied to the rotary device 1 shown in FIG. 1. It should be noted that FIGS. 4A and 4B show the outer peripheral rotor 2 in partially omitted manner.

FIG. 4A shows a condition that the inner peripheral rotor 3 is not being centered with respect to the outer peripheral rotor 2 due to imbalance of the inner peripheral rotor 3. As shown in FIG. 4A, the axis of the inner peripheral rotor 3 deviates from the rotational center O to the upper side in FIG. 4A due to the imbalance thereof. Only at one site in the centering structure 5, the roller 13 makes contact with the pair of outer and inner peripheral cam surfaces 11 and 12. On the other hand, at the other three sites in the centering structure 5, each roller 13 makes contact with each outer peripheral cam surface 11 by a centrifugal force without making contact with each inner peripheral cam surface 12.

When relative rotation is produced between the both rotors 2 and 3 in the condition shown in FIG. 4A, at the upper-side one of the sites in the centering structure 5 shown in FIG. 4A, the roller 13 rolls along the pair of outer and inner peripheral cam surfaces 11 and 12 as explained above with FIGS. 2A, 2B, 3A and 3B. Accordingly, the inner peripheral rotor 3 is pressed toward the rotational center O. Because of this, likewise at the other three sites in the centering structure 5 as well, each roller 13 makes contact with each pair of outer and inner peripheral cam surfaces 11 and 12. Consequently, deviation in axis of the inner peripheral rotor 3 from the rotational center O is modified. This results in centering of the inner peripheral rotor 3 with respect to the outer peripheral rotor 2.

Figure 5:
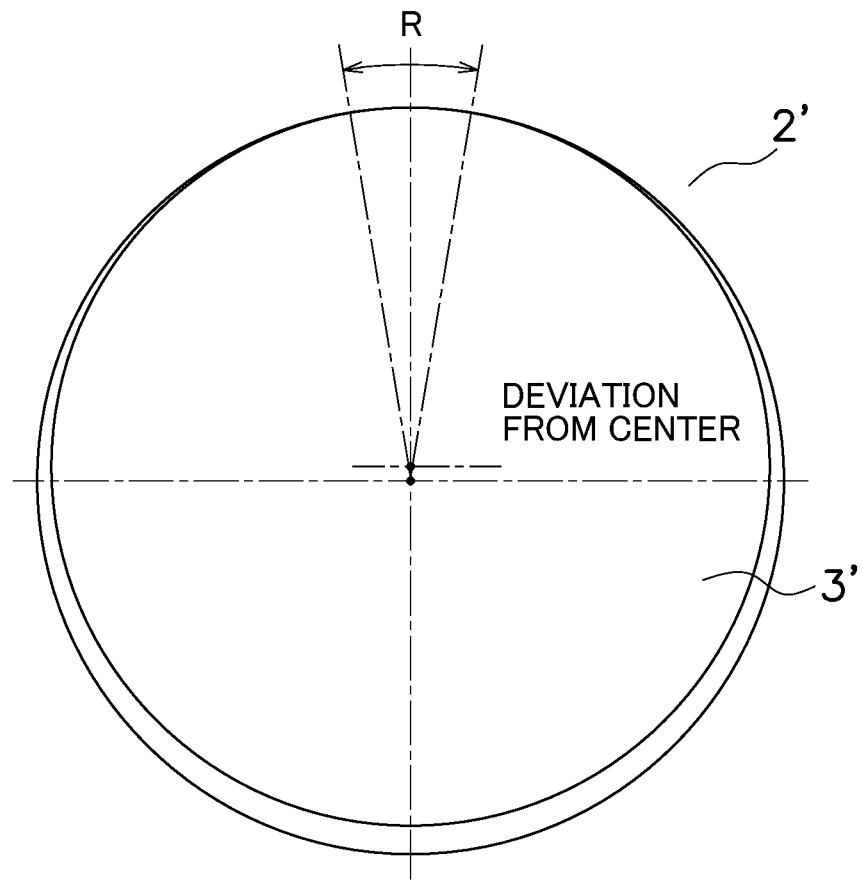
FIG. 5 is a diagram for explaining working of a well-known centering structure.

FIG. 5 shows a well-known centering structure. In the well-known structure, when an inner peripheral rotor 3' is unbalanced, the axis of the inner peripheral rotor 3' deviates from that of an outer peripheral rotor 2' (or a housing), whereby the both rotors 3' and 2' make contact with each other only in a partial region R on the circumferences of the both rotors 3' and 2'(an upper position in FIG. 5). Besides, this contact part R remains unchanged during actuation. Because of this, only the contact part R receives a load. Besides, large friction resistance is generated in the contact part R.

By contrast, in the preferred embodiment shown in FIGS. 4A and 4B, even when the inner peripheral rotor 3 is unbalanced and the axis thereof deviates from that of the outer peripheral rotor 2, each pair of outer and inner peripheral cam surfaces 11 and 12 uniformly make contact with each other at the four sites in the centering structure 5 due to the working of the centering structure 5. Because of this, abrasion can be inhibited in each pair of cam surfaces 11 and 12 provided as the contact part. Besides, each roller 13 rolls on each pair of cam surfaces 11 and 12, whereby friction resistance can be significantly reduced in magnitude.

[Application Example Using Centering Structure]

(1) Function as Torque Limiter

The centering structure 5 described above is enabled to function as a torque limiter. Specifically, the outer peripheral rotor 2 and the inner peripheral rotor 3 are allowed to be rotated relative to each other within the range of angle θ shown in FIG. 3B. In other words, a torque is not transmitted between the outer peripheral rotor 2 and the inner peripheral rotor 3 within the range of angle θ. On the other hand, each roller 13 makes contact with each pair of outer and inner peripheral cam surfaces 11 and 12 in a region that the both rotors 2 and 3 are rotated relative to each other by greater than the angle θ, whereby the both rotors 2 and 3 are prevented from being further rotated relative to each other. In other words, a torque is transmitted between the outer peripheral rotor 2 and the inner peripheral rotor 3 through each roller 13 in the region that the both rotors 2 and 3 are rotated relative to each other by greater than the angle θ.

(2) Damper Function

When each of the outer and inner peripheral cam surfaces 11 and 12 is set to have an appropriate profile, it is possible to realize a damper function that torsional stiffness increases with relative angle (torsion angle) between the outer peripheral rotor 2 and the inner peripheral rotor 3.

Figure 6:
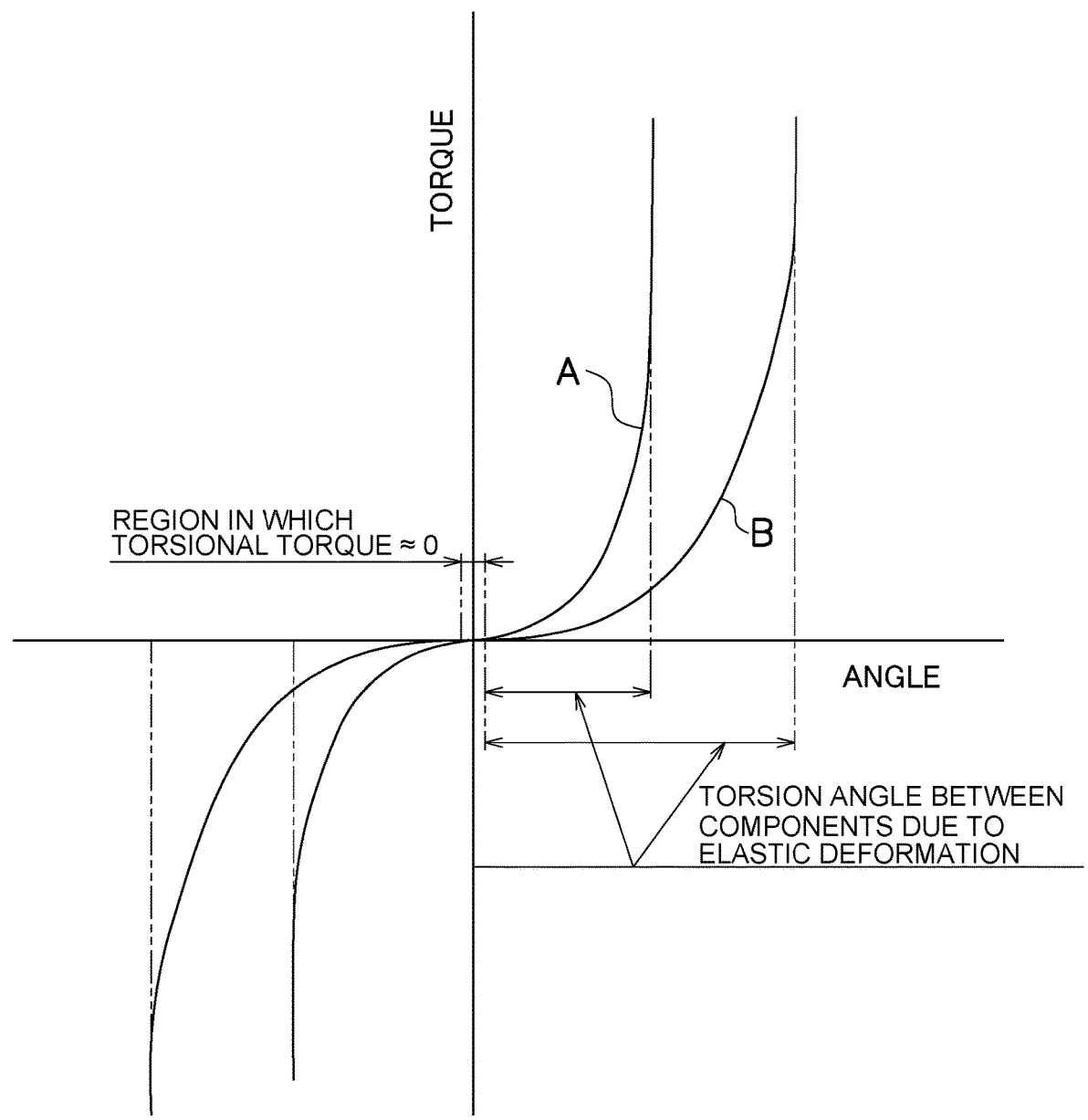
FIG. 6 is a chart showing an example of torsional characteristics of the centering structure.

FIG. 6 shows a relation (torsional characteristics) between relative rotational angle (torsion angle) between the outer peripheral rotor 2 and the inner peripheral rotor 3 and torque transmitted between the both rotors 2 and 3. It is possible to change the torsional characteristics to, for instance, characteristic A or B shown in FIG. 6 by suitably setting a radial gap between the outer peripheral rotor 2 and the inner peripheral rotor 3, the shape of each cam surface, the stiffness of each rotor 2, 3.

Besides, when a flat surface is set as each cam surface, each roller 13 does not get stuck with the flat surface. Furthermore, a force directed to the center does not act on the inner peripheral rotor 3 at the flat surface. When the flat surface is elongated, it is also possible to widen "region in which torsional torque≈0" shown in FIG. 6.

Other Preferred Embodiments

The present invention is not limited to the preferred embodiment described above, and a variety of changes or modifications can be made without departing from the scope of the present invention.

(a) The aforementioned preferred embodiment has been explained by exemplifying a rotor as a first member disposed on the outer peripheral side. However, the present invention is similarly applicable even when a stationary housing is provided as the first member.

(b) The aforementioned preferred embodiment has been explained by exemplifying a configuration that the inner peripheral rotor 3 is centered with respect to the outer peripheral rotor 2. However, the present invention is similarly applicable even to a configuration that an outer peripheral rotor is centered with respect to an inner peripheral rotor made in the form of, for instance, a shaft.

(c) The aforementioned preferred embodiment has been explained with the device to which the centering structure is applied and in which the outer peripheral rotor having an annular shape is provided as the first member and the inner peripheral rotor having a disc shape is provided as the second member. However, the device to which the centering structure is applied is not limited to the above. For example, any suitable member can be provided as the first member as long as it includes an annular portion having an inner peripheral surface. On the other hand, any suitable member can be provided as the second member as long as it has an outer peripheral surface.

Figure 7:
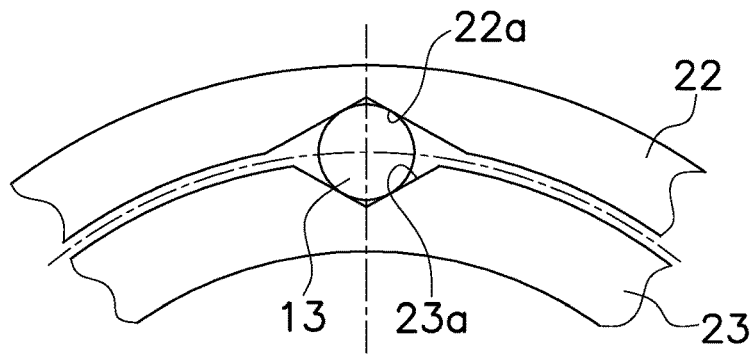
FIG. 7 is a diagram showing an example alternative to a cam surface in the preferred embodiment.
Figure 8:
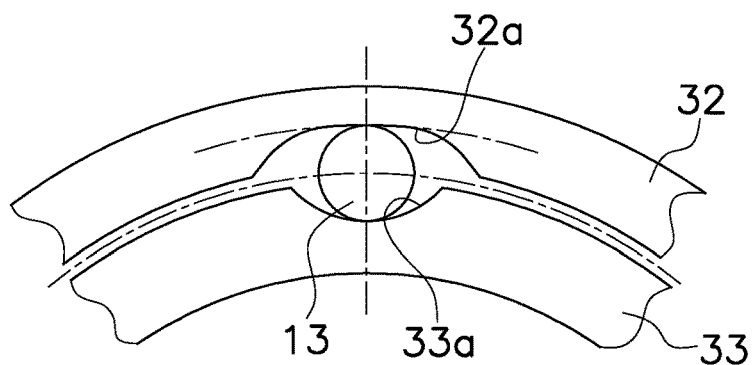
FIG. 8 is a diagram showing another example alternative to the cam surface.
Figure 9:
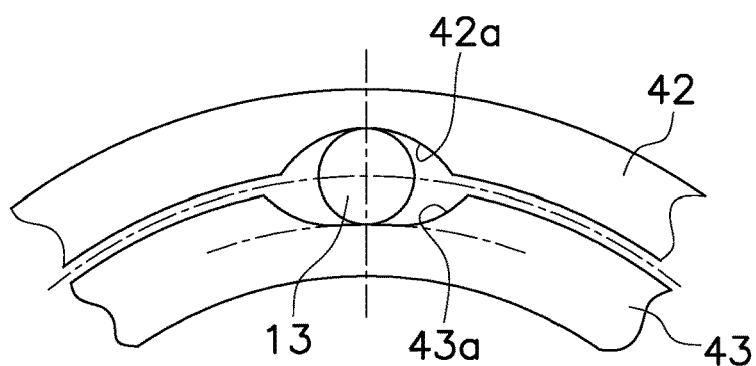
FIG. 9 is a diagram showing yet another example alternative to the cam surface.

(d) Each cam surface is shaped to bulge to the outer or inner peripheral side. However, the manner in which each cam surface is shaped to "bulge" as described above is not limited to that in the aforementioned preferred embodiment. A variety of changes can be made for the shape of each cam. For example, FIG. 7 shows an example that each of an outer peripheral cam surface 22a of an outer peripheral rotor 22 and a cam surface 23a of an inner peripheral rotor 23 is made in the shape of not a curved surface but a flat slope and is shaped to bulge to the outer or inner peripheral side. Alternatively, FIG. 8 shows an example that an outer peripheral cam surface 32a of an outer peripheral rotor 32 has a circular-arc portion (flat portion) and is entirely shaped to bulge to the outer peripheral side. On the other hand, a cam surface 33a of an inner peripheral rotor 33 has a similar shape to the corresponding one in the example of FIG. 1. Yet alternatively, FIG. 9 shows an example that an outer peripheral cam surface 42a of an outer peripheral rotor 42 has a similar shape to the corresponding one in the example of FIG. 1 whereas a cam surface 43a of an inner peripheral rotor 43 includes a circular-arc portion (flat portion) and is entirely shaped to bulge to the inner peripheral side.

REFERENCE SIGNS LIST

1 Rotary device (device)
2 Outer peripheral rotor (first member)
3 Inner peripheral rotor (second member)
5 Centering structure
11 Outer peripheral cam surface
12 Inner peripheral cam surface
13 Roller (rolling element)
15 Accommodation space

What is claimed is:

1. A centering structure provided in a device including a first member and a second member, the first member including an inner peripheral surface having an annular shape, the second member rotatable relative to the first member within a predetermined angular range, the second member including an outer peripheral surface having an annular shape, the outer peripheral surface opposed to the inner peripheral surface, the centering structure comprising:

a plurality of outer peripheral cam surfaces circumferentially aligned on the inner peripheral surface of the first member;

a plurality of inner peripheral cam surfaces opposed to the plurality of outer peripheral cam surfaces on the outer peripheral surface of the second member, the plurality of inner peripheral cam surfaces forming a plurality of accommodation spaces together with the plurality of outer peripheral cam surfaces therebetween; and a plurality of rolling elements disposed in the plurality of accommodation spaces, each of the plurality of rolling elements configured to roll along each of the plurality of outer peripheral cam surfaces and each of the plurality of inner peripheral cam surfaces, the plurality of rolling elements configured to move either the first member or the second member in such a direction as to cause a center of the inner peripheral surface of the first member and a center of the outer peripheral surface of the second member to be matched with each other when the first member and the second member are rotated relative to each other.

2. The centering structure according to claim 1, wherein each of the plurality of accommodation spaces is gradually reduced in radial gap from a circumferential middle thereof to both circumferential sides thereof.

3. The centering structure according to claim 1, wherein each of the plurality of outer peripheral cam surfaces of the first member bulges to an outer peripheral side, and each of the plurality of inner peripheral cam surfaces of the second member bulges to an inner peripheral side.

4. The centering structure according to claim 3, wherein each of the plurality of outer peripheral cam surfaces is gradually reduced in radius from a circumferential center thereof to both circumferential sides thereof, and each of the plurality of inner peripheral cam surfaces is gradually increased in radius from a circumferential center thereof to both circumferential sides thereof.

5. The centering structure according to claim 1, wherein each of the plurality of outer peripheral cam surfaces is opposed to another of the plurality of outer peripheral cam surfaces through the center of the inner peripheral surface, and each of the plurality of inner peripheral cam surfaces is opposed to another of the plurality of inner peripheral cam surfaces through the center of the outer peripheral surface.

6. The centering structure according to claim 1, wherein
the first member includes an annular portion, the annular portion including the inner peripheral surface, and
the second member includes a disc portion, the disc portion including the outer peripheral surface, the disc portion disposed on an inner peripheral side of the annular portion.

7. A rotary device comprising:
a first member including an inner peripheral surface having an annular shape;
a second member rotatable relative to the first member within a predetermined angular range, the second member including an outer peripheral surface having an annular shape, the outer peripheral surface opposed to the inner peripheral surface; and
the centering structure recited in claim 1, the centering structure configured to center the first and second members.

\* \* \* \* \*